United States Patent [19]

Pieper

[11] Patent Number: 5,622,199
[45] Date of Patent: Apr. 22, 1997

[54] LOCKING APPARATUS AND METHOD FOR HYDRAULIC VALVE ASSEMBLY

[75] Inventor: Patrick J. Pieper, Carol Stream, Ill.

[73] Assignee: Case Corporation, Racine, Wis.

[21] Appl. No.: 575,986

[22] Filed: Dec. 21, 1995

[51] Int. Cl.⁶ .................................................. F16K 35/00
[52] U.S. Cl. .............................. 137/15; 137/383; 251/94
[58] Field of Search ........................ 137/383, 15; 251/94, 251/111

[56] References Cited

U.S. PATENT DOCUMENTS

| | | | |
|---|---|---|---|
| 2,276,979 | 3/1942 | Jacobi | 251/94 |
| 4,083,382 | 4/1978 | Khatti et al. | 251/94 |
| 4,306,586 | 12/1981 | Spencer | 251/94 |
| 4,652,059 | 3/1987 | Wittich | 251/94 |
| 4,995,421 | 2/1991 | Bonacorsi et al. | 137/383 |
| 5,193,431 | 3/1993 | Propsting et al. | 92/21 MR |

FOREIGN PATENT DOCUMENTS 1054856  4/1959  Germany .................................. 251/94

*Primary Examiner*—A. Michael Chambers
*Attorney, Agent, or Firm*—Jansson & Shupe, Ltd.

[57] ABSTRACT

A hydraulic valve assembly for use with a fluid motor has a control device, e.g., a valve spool, mounted for movement between a neutral position for motor disabling and an output position for motor operation. The improvement comprises a locking surface on the device and a lock member engaging the surface when the device is in the neutral position. Such lock member prevents movement of the device to the output position. The valve assembly may have two control devices, each having a locking surface. The lock member engages (or disengages from) such surfaces simultaneously. Means for manual and remote shifting of the locking member are also disclosed. The new assembly is particularly useful in mobile machines having hydraulically-operated equipment, e.g., a loader bucket, which is raised above ground.

14 Claims, 4 Drawing Sheets

LOCKING APPARATUS AND METHOD FOR HYDRAULIC VALVE ASSEMBLY

FIELD OF THE INVENTION

This invention relates generally to valves and valve actuation and, more particularly, to hydraulic valves having means to prevent actuation.

BACKGROUND OF THE INVENTION

Mobile machines, especially off-road construction and agricultural machines, use hydraulic systems to power the machine implements as well as any attachments which may be temporarily used with such machines. Hydraulic power and the pumps, motors and valves used to deliver such power are ideal for these functions. Hydraulic power provides excellent control and the machine designer is not limited by the constraints which would otherwise be imposed by rigid mechanical drive lines.

Some machines of the foregoing type use a loader bucket or other type of work implement which may be raised well above the ground and held there indefinitely by maintaining the hydraulic valve control spools associated with such implement in centered position(s). A particular type of construction machine which uses are loader bucket and other work implements is known as a skid-steer loader.

(A skid-steer loader is so named because none of the wheels are capable of being pivot-steered. Rather, steering is by powering the left-side wheels and the right-side wheels at different rotation speeds. Some wheel skidding results.)

A skid-steer loader is configured in such a way that an operator must gain access to the operator's seat over the front of the machine. There is no barrier preventing such access.

Because of machine geometry, the absence of a compartment front barrier is necessary to permit the operator to easily see the work being performed. And if the bucket is raised, such operator may walk or crawl under it when boarding or leaving the machine.

Designers of such machines (as well as those designing other types of construction machines) work hard to prevent the implement-holding valve spools from being moved out of their neutral or implement-holding positions until intentionally moved therefrom. A way of doing so is to apply some sort of external locking mechanism to the mechanical linkage extending between the operator's lever and the valve spool itself.

But operators have demonstrated that linkage-attached external locking mechanisms can be defeated, either intentionally or by simply failing to properly maintain such mechanisms. Sooner or later, such mechanisms are damaged in use or wear out and need repair.

An improved lockout mechanism which overcomes some of the problems and shortcomings of the prior art would be an important advance in the art.

OBJECTS OF THE INVENTION

It is an object of the invention to provide a spool lockout apparatus and method overcoming some of the problems and shortcomings of the prior art.

Another object of the invention is to provide a spool lockout apparatus and method which do not rely upon the integrity of the valve operating linkage.

Another object of the invention is to provide a spool lockout apparatus and method which "operate" directly on a valve control spool.

Yet another object of the invention is to provide a spool lockout apparatus and method which provide positive mechanical retention of a valve spool in a neutral position. How these and other objects are accomplished will become apparent from the following descriptions and from the drawings.

SUMMARY OF THE INVENTION

The invention is particularly useful in applications involving a machine having an implement which can be raised above the ground. As an example, a front-end loader has a load-carrying bucket which can be raised above the ground and retained there by a hydraulic valve. Personnel may crawl or walk under the bucket and the invention involves a lock member which helps prevent the valve from being inadvertently actuated and lowering the bucket.

An aspect of the invention involves the combination of a fluid valve assembly and a fluid motor such as a hydraulic cylinder (a linear motor) or a rotary motor. The assembly has at least one control device, e.g., a valve spool, mounted for movement between a neutral position for motor disabling and either of two output positions (e.g., "raise" or "lower") for motor operation.

The improvement comprises a lock member coacting with a locking surface on the device. When the device is in the neutral position, the lock member engages the locking surface and prevents movement of the device to the output position.

The control device has a first end and includes a flow-controlling groove for operating the motor. The locking surface is intermediate the first end and the groove. More specifically, the first end and the groove have an enlarged portion between them and the locking surface is a notch (preferably a circumferential notch) in the enlarged portion.

In another aspect of the invention, the lock member includes a first portion having a first cross-sectional area and a second portion having a second cross-sectional area less than the first cross-sectional area. It is the first portion which engages the surface when the control device is locked in its neutral position. And when the control device is in an output position controlling the motor, the second portion is in registry with the device but "clears" the device so it can move freely.

The hydraulic valve assembly may include but a single control device as noted above or, more likely, it will have plural control devices, each mounted for movement between a neutral position and an output position. In such configuration, each device associated with operation of the implement which can be raised above ground includes a locking surface. When the devices are in the neutral position, the lock member engages the locking surfaces of all such devices and substantially prevents their movement.

Where plural control devices are involved, the lock member includes plural first portions. When the devices are in the neutral position, each first portion engages a separate, respective locking surface of a separate one of the devices, thereby substantially preventing movement of such devices. And the lock member also has plural second portions. When either device is in its output position, the second portions are in registry with but spaced from respective devices.

In yet another aspect of the invention, the assembly has first, second and third control devices, each mounted for movement between a neutral position and an output position. The first and second devices (those devices associated with, e.g., the loader bucket) each include a locking surface. When the first and second devices are in the neutral position, the lock member engages the surfaces of the first and second devices and substantially prevents movement of such devices. However, operation of the third device is not affected by locking member position and may be freely actuated, irrespective of the position of such member.

And the new assembly is very easy to use in hydraulic circuits requiring remote-control capability. The assembly includes a pilot pressure chamber in pressure-communicating relationship to the lock member. The lock member may be moved by increasing the pressure in the chamber. In a highly preferred embodiment, there is also a manual release mechanism coupled to the lock member for manually disengaging the lock member from the device locking surface. Such mechanism is particularly useful on a machine having an inoperative hydraulic system (because of a "dead" engine or the like) in which it is not possible to develop pressure in the pilot pressure chamber. Manual actuation of the mechanism disengages the lock member from the locking surface(s) of the control device(s).

Another aspect of the invention involves a method for retaining hydraulic valve control spools in their respective neutral positions. The method includes the steps of providing a lock member in the assembly, positioning the spools at their respective neutral positions and moving the lock member to engage each spool. Each spool has a notch formed therein and the moving step includes moving the lock member to engage each notch, preferably substantially simultaneously.

Further details regarding the invention are set forth in the following detailed description and in the drawings.

DETAILED DESCRIPTION OF PREFERRED EMBODIMENTS

Figure 1:
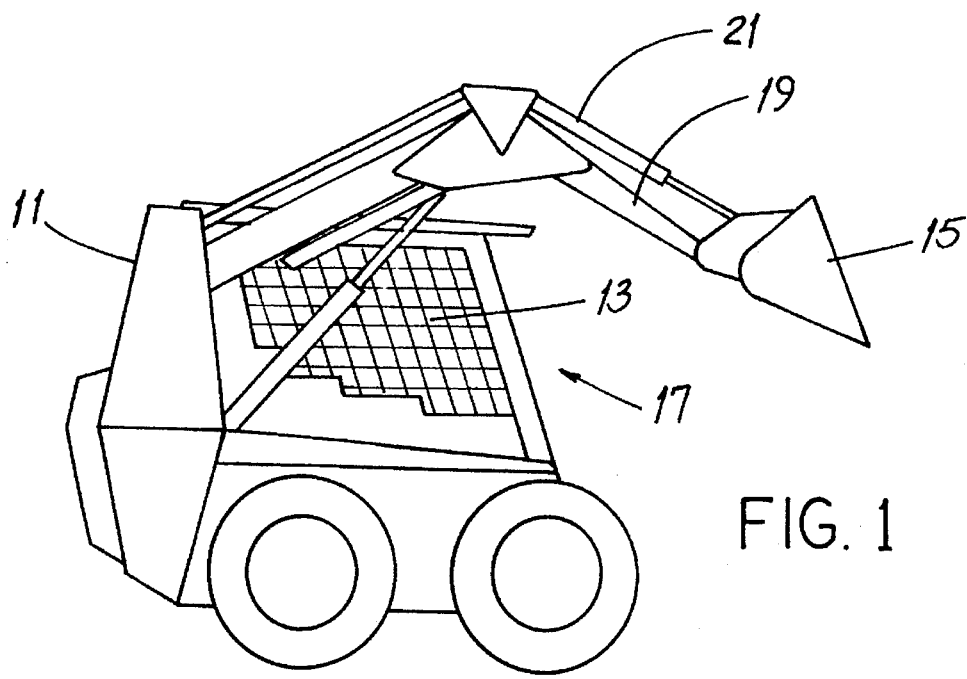
FIG. 1 is a representative side elevation view of an exemplary machine, a skid-steer front end loader, upon which the inventive valve assembly may be used.

Before describing the new hydraulic valve assembly 10 and method for locking out one or more valve spools, it will be helpful to have an understanding of one type of machine upon which the invention may be used. FIG. 1 shows a skid-steer front end loader 11 having an operator's cab 13 and a boom-supported digging and earthmoving bucket 15 at the front of the loader 11. The geometry of the loader 11 is such that when the bucket 15 is low, the operator watches the bucket 15 by looking downward at a relatively-steep angle. And to avoid obstructing the operator's vision, the front 17 of the cab 13 is free of barriers.

Figure 2:
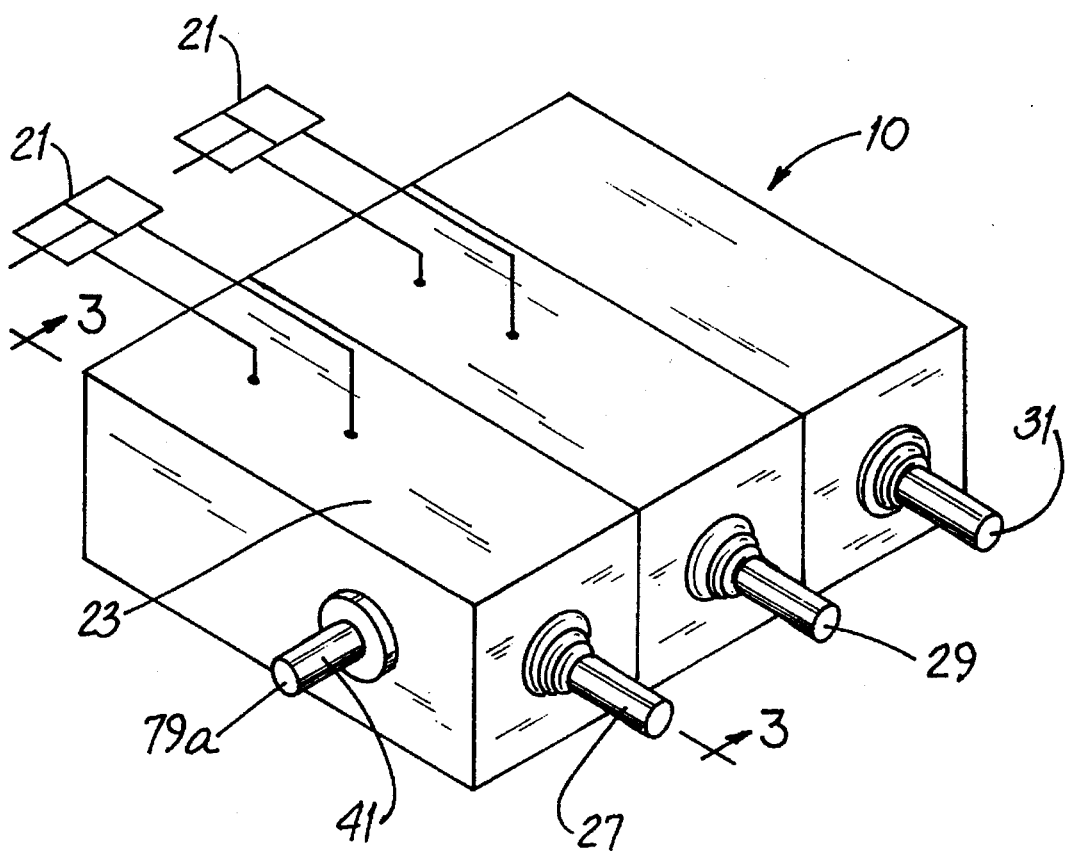
FIG. 2 is a perspective view of the inventive valve assembly shown in conjunction with symbolic hydraulic cylinders controlled thereby.
Figure 3:
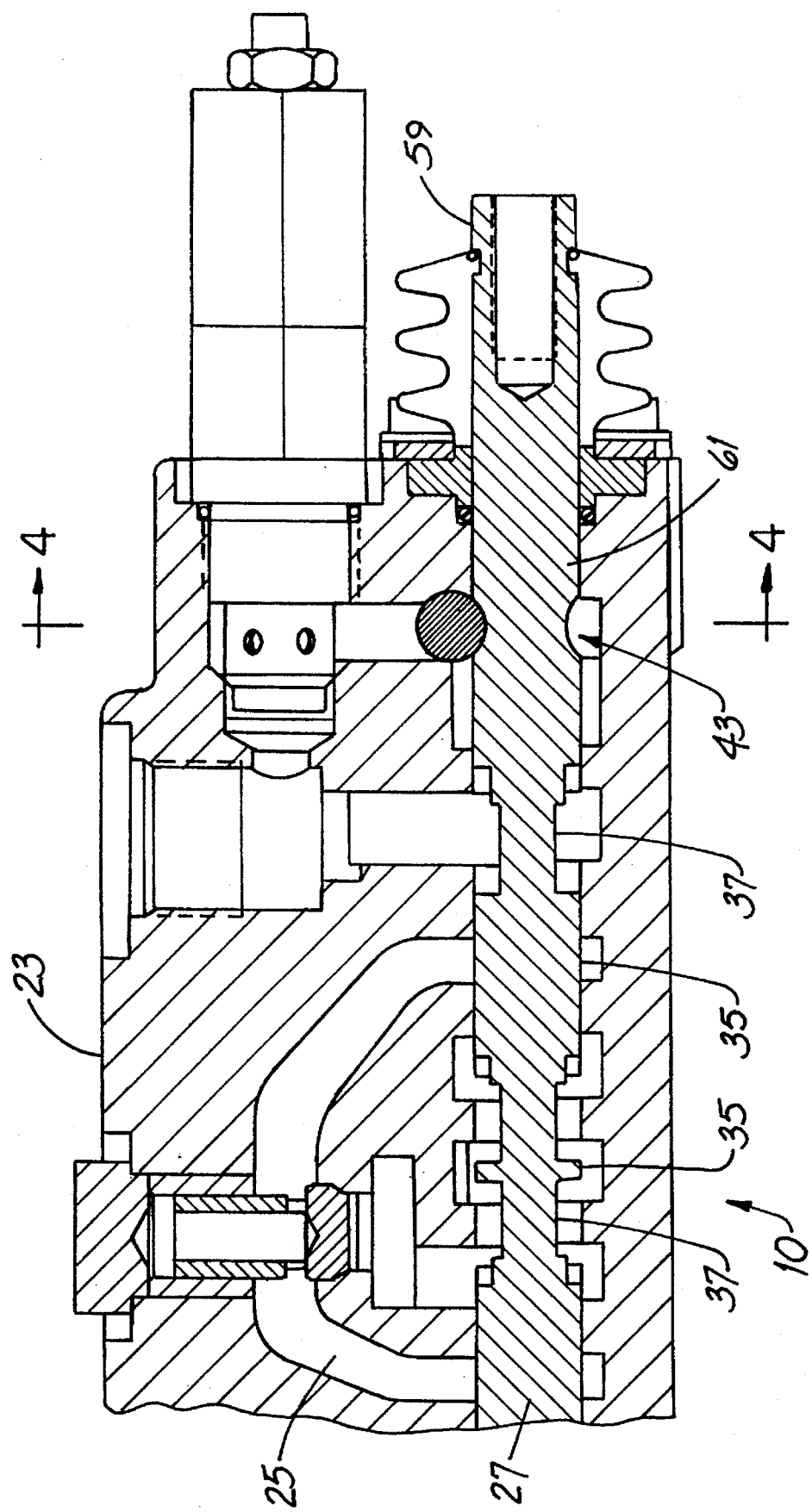
FIG. 3 is a sectional elevation view of the valve assembly of FIG. 2 taken generally along the viewing plane 3—3 thereof.
Figure 4:
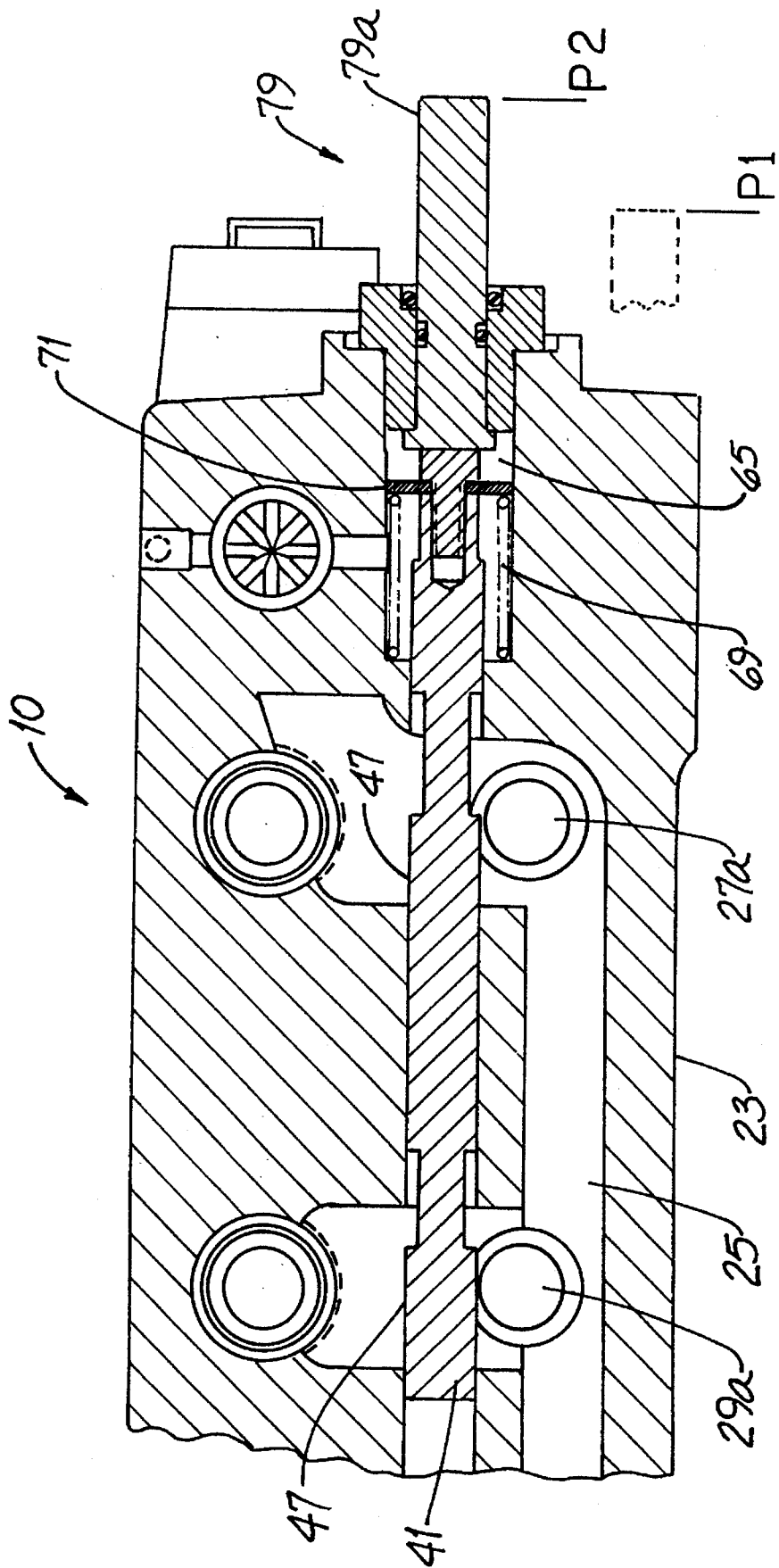
FIG. 4 is a sectional elevation view of the valve assembly of FIGS. 2 and 3 taken generally along the viewing plane 4—4 of FIG. 3.

Referring also to FIGS. 2, 3 and 4, the bucket height and pivoted relationship of the bucket 15 to its support boom 19 are controlled by hydraulic cylinders 21. One cylinder 21 is shown in FIG. 1 and that and another cylinder 21 are represented by like-numbered symbols in FIG. 2.

In turn, fluid flow to such cylinders is controlled by a hydraulic valve assembly 10 in the cab 13. Such assembly 10 has a valve body 23 with internal passages 25 and elongate fluid-directing control devices 27, 29 (e.g., spools 27a, 29a), mounted for axial movement with respect to such passages 25.

The spools 27a, 29a control the boom 19 and the tilt of the bucket 15, respectively. Each spool 27a, 29a is generally cylindrical and has lands 35 and grooves 37 that coact with internal valve passages 25. When a spool 27a, 29a is in an output position, i.e., not centered, the spool 27a, 29a directs fluid to a hydraulic cylinder 21, for example, and causes the cylinder 21 to extend or retract. And when a spool 27a, 29a is in its neutral position as shown in FIGS. 3 and 4, such spool 27a, 29a blocks passages 25 to and from a cylinder 21 and holds such cylinder 21 (and therefore the bucket 15 or boom 19 attached thereto) in a particular position. The cylinder 21 is thereby disabled.

Figure 5:
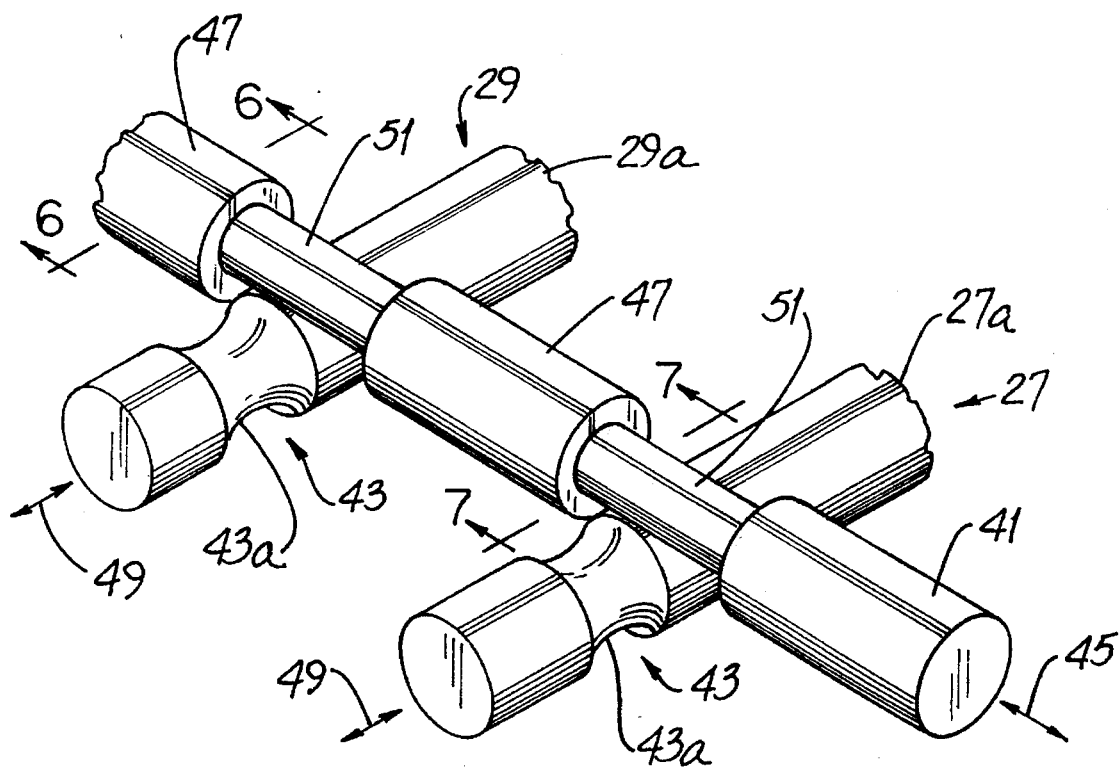
FIG. 5 is a simplified perspective view showing the relationship between hydraulic valve spools and the lock member used to secure such spools in their neutral positions.

FIG. 5 is a simplified representation of two control devices embodied as spools 27a, 29a and of a movable lock member 41 configured to "lock out" the spools 27a, 29a when such spools 27a, 29a are in their neutral positions. Each spool 27a, 29a includes a locking surface 43, an exemplary one of which is a circumferential notch 43a around the spool 27a, 29a. (It is to be appreciated that the locking surface 43 may be a chord-like notch across the spool 27a, 29a if spool rotational orientation could readily be controlled during assembly so that the notch is always toward the lock member 41.)

When the spools 27a, 29a are in neutral, the notch 43a is in registry with the lock member 41. And assuming the valve assembly 10 is mounted horizontally as in FIGS. 3 and 4, the notch 43a is in vertical registry with the lock member 41.

The relative spacing of the spools 27a, 29a to the lock member 41 is such that when the spools 27a, 29a are in neutral and when the lock member 41 is shifted axially in one direction or the other as indicated by the double-headed arrow 45, the first or enlarged portions 47 of such member 41 are in the notches 43a of the spools 27a, 29a. The spools 27a, 29a are thereby simultaneously "locked out" in that the lock member 41 interferes with spool travel. That is, such spools 27a, 29a are precluded from shifting axially in the directions of the double-headed arrows 49.

Figure 6:
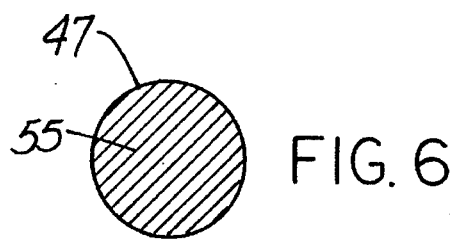
FIG. 6 is a cross-sectional view of an enlarged portion of the lock member shown in FIG. 5 taken generally along the viewing plane 6—6 thereof.
Figure 7:
FIG. 7 is a cross-sectional view of a reduced portion of the lock member shown in FIG. 5 taken generally along the viewing plane 7—7 thereof.

On the other hand, when the second portions 51 (having a cross-sectional area 53 less than the cross-sectional areas 55 of the first portions 47 as shown in FIGS. 6 and 7) of the lock member 41 are in registry with the notches 43a, the second portions 51 "clear" the spools 27a, 29a. Such spools 27a, 29a may then be moved freely between their neutral and output positions as indicated by the arrows 49.

Referring particularly to FIG. 3, the control device 27 has a first end 59 and the locking surface 43 is intermediate the first end 59 and the groove 37. More specifically, the first end 59 and the groove 37 have an enlarged portion 61 therebetween and the locking surface 43 is in the enlarged portion 61.

The hydraulic valve assembly 10 may include but a single control device 27, 29 as noted above or, more likely, it will have plural control devices 27, 29, each mounted for movement between a neutral position and one or two output positions. In such configuration, the lock member 41 engages the locking surfaces 43 of plural devices 27, 29 and prevents significant device movement.

The valve assembly 10 shown in FIG. 2 has first, second and third control devices 27, 29, 31 respectively, each mounted for movement between a neutral position and an output position. The first and second devices 27, 29 (those devices 27, 29 associated respectively with the loader boom 19 and bucket 15 when the assembly 10 is on an exemplary skid-steer loader 11) each include a locking surface 43.

When the first and second devices 27, 29 are in the neutral position, the lock member 41 can be positioned to lock out such devices 27, 29. However, operation of the third device 31 is not affected by locking member position and such device 31 may be freely actuated, irrespective of the position of such member 41. The third device 31 may be used to control an attachment at the rear of the loader 11, for example.

Referring further to FIG. 4, the new assembly 10 is very easy to use in hydraulic circuits requiring remote-control capability. The assembly 10 includes a pilot pressure chamber 65 in pressure-communicating relationship to the lock member 41. By increasing the pressure in the chamber 65, the lock member 41 may be moved to a position P1 freeing the control devices 27, 29 for movement. To state it another way, increasing the pressure in the chamber 65 urges the lock member 41 leftward as viewed in FIG. 4.

A compression spring 69 is in the chamber 65 and acts on a biasing disc 71 mounted on the member 41. In the absence of adequate control pressure in the chamber 65, the member 41 is urged toward its lockout position P2 as shown in FIG. 4. And when both devices 27, 29 are in the neutral position or move to such position, the member 41 is urged into its lockout position P2.

Because the member 41 is spring biased to its lockout position P2, it is highly preferred that there be some way to manually release it. To that end, the assembly 10 includes a manual release mechanism 79 coupled to the lock member 41 for manually disengaging the lock member 41 from the device locking surfaces 43. In the illustrated embodiment, the release mechanism 79 is a push-rod 79a which may be urged axially inward (leftward in FIG. 4) by hand force. Such mechanism 79 is particularly useful on a machine having an inoperative hydraulic system (because of a "dead" engine or the like) in which it is not possible to develop pressure in the pilot pressure chamber 65. Manual actuation of the mechanism 79 disengages the lock member 41 from the locking surface(s) 43 of the control device(s) 27, 29.

A method for retaining hydraulic valve control spools 27a, 29a in their respective neutral positions includes the steps of providing a lock member 41 in the assembly 10, positioning the spools 27a, 29a at their respective neutral positions (as illustrated in FIG. 3) and moving the lock member 41 to engage each spool 27a, 29a. Each spool 27a, 29a has a notch 43a formed therein and the moving step includes moving the lock member 41 to engage each notch 43a, preferably substantially simultaneously.

Certain aspects of operation of the new assembly 10 are noteworthy. Movement of a spool 27a, 29a plays no part in moving the lock member 41. Nor does movement of the lock member 41 play any part in moving a spool 27a, 29a. That is, actual movement (as distinguished from preventing or permitting movement) of the lock member 41 and a spool 27a, 29a occur wholly independently of one another.

While the principles of the invention have been shown and described in connection with specific embodiments, it is to be understood clearly that such embodiments are by way of example and are not limiting.

What is claimed is:

1. In a hydraulic valve assembly for a mobile machine, the assembly having first and second control spools, each mounted for movement between a neutral position and either of two output positions and each having a locking surface, a method for retaining the spools in their respective neutral positions including:

providing a lock member in the assembly and extending across the control spools;

positioning the spools at their said respective neutral positions;

axially moving the lock member to engage each spool locking surface and thereby lock the first and second control spools in their respective neutral positions; and axially moving the lock member to disengage each spool locking surface while maintaining the lock member extending across at least one of the spools.

2. The method of claim 1 wherein each spool has a notch formed therein and the moving step includes moving the lock member to engage each notch.

3. The method of claim 2 wherein each notch is engaged substantially simultaneously.

4. In the combination of a fluid valve assembly and plural bi-directional fluid motors mounted on a mobile machine, the assembly having plural control valve spools, each controlling a separate one of the motors and each mounted for movement between a neutral position for motor disabling and either of two output positions for motor operation, the improvement wherein:

each spool has a locking surface;

a lock member extends across the plural valve spools;

when the spools are in their neutral positions, the lock member engages the locking surface of the plural spools and prevents movement of the spools to either of their respective two output positions.

5. The combination of claim 4 wherein:

at least one spool has a first end and includes a circumferential flow groove for controlling operation of the motor; and the locking surface is intermediate the first end and the groove.

6. The combination of claim 5 wherein the first end and the groove have an enlarged portion therebetween and the locking surface is a notch in the enlarged portion.

7. The combination of claim 4 wherein:

the lock member is an elongate bar and includes a first portion having a first cross-sectional area and a second portion having a second cross-sectional area less than the first cross-sectional area; and the first portion engages the locking surface of one of the spools.

8. The combination of claim 4 wherein:

the lock member includes a first portion having a first cross-sectional area and a second portion having a second cross-sectional area less than the first cross-sectional area; and when one of the spools is in the output position, the second portion is in registry with the locking surface of that spool which is in the output position.

9. The combination of claim 4 wherein:

the lock member includes plural first portions; and when the spools are in their respective neutral positions, each first portion engages a respective locking surface of one of the spools.

10. The combination of claim 9 wherein:

the lock member includes plural second portions; and when either spool is in one of its output positions, the second portions are in registry with respective spools.

11. The combination of claim 10 wherein:

each first portion has a first cross-sectional area and each second portion has a second cross-sectional area less than the first cross-sectional area.

12. The combination of claim 4 wherein:

the plural valve spools are first and second valve spools;

the assembly has a third control valve spool mounted for movement between a neutral position and an output position;

when the first and second spools are in their respective neutral positions, the lock member engages the locking surfaces of the first and second spools and substantially prevents movement of such spools; and the third valve spool is spaced from the lock member and is freely movable, notwithstanding that movement of the first and second valve spools is prevented.

13. The combination of claim 4 wherein:

the assembly includes a pilot pressure chamber in pressure-communicating relationship to the lock member, whereby the lock member may be moved out of engagement with the spools by increasing the pressure in the chamber.

14. The combination of claim 13 including a manual release mechanism coupled to the lock member for manually disengaging the lock member from the spool locking surfaces.

* * * * *